United States Patent
James, Jr. et al.

(10) Patent No.: US 6,363,621 B1
(45) Date of Patent: Apr. 2, 2002

(54) METHOD AND APPARATUS FOR TESTING WEB BAGGINESS

(75) Inventors: Ledell James, Jr., Prichard; Christopher Robinson Read, Spanish Fort, both of AL (US)

(73) Assignee: International Paper Company, Purchase, NY (US)

( * ) Notice: Subject to any disclaimer, the term of this patent is extended or adjusted under 35 U.S.C. 154(b) by 0 days.

(21) Appl. No.: 09/276,367

(22) Filed: Mar. 25, 1999

(51) Int. Cl.[7] ................................................ G01B 5/25
(52) U.S. Cl. ......................................................... 33/533
(58) Field of Search ........................... 33/1 E, 1 H, 369, 33/404, 407, 409, 408, 410, 521, 5, 2 R, 8, 549, 573, 613, 645, 533; 73/159; 248/431

(56) References Cited

U.S. PATENT DOCUMENTS

| | | | |
|---|---|---|---|
| 295,606 A | * 3/1884 | Wooldridge | 248/431 |
| 736,100 A | * 8/1903 | Williamson | 33/1 H |
| 921,470 A | * 5/1909 | Sheppard | 33/369 |
| 2,343,229 A | * 2/1944 | Stone et al. | 73/159 |
| 2,802,270 A | * 8/1957 | Christoffersen | 33/409 |
| 2,809,519 A | * 10/1957 | Kaestner | 73/159 |
| 2,833,145 A | * 5/1958 | McCullough | 73/159 |
| 2,896,196 A | * 7/1959 | Hartford et al. | 73/159 |
| 3,298,537 A | * 1/1967 | Di Marco | 248/431 |
| 3,499,306 A | * 3/1970 | Pearson | 73/159 |
| 3,703,097 A | * 11/1972 | Kilpatrich et al. | 73/159 |
| 3,938,382 A | * 2/1976 | Takada et al. | 73/159 |
| 4,500,607 A | 2/1985 | Louden | 428/511 |
| 5,678,447 A | 10/1997 | Graff | 73/159 |
| 5,778,546 A | * 7/1998 | Williamson | 33/1 H |
| 5,778,724 A | 7/1998 | Clapp et al. | 73/159 |

* cited by examiner

Primary Examiner—Christopher W. Fulton
Assistant Examiner—Gail Verbitsky
(74) Attorney, Agent, or Firm—Luedeka, Neely & Graham, P.C.

(57) ABSTRACT

A method and portable apparatus to evaluate the planar flatness of a paper sheet comprises a pair of closely spaced horizontal edges secured in relative parallelism. The horizontal edges are separated by about three feet. The horizontal edges define a horizontal reference plane over which a sheet section of paper web is mildly tensioned with the web machine direction of the paper sheet oriented transversely of the edges. Substantially between the horizontal edges but slightly below the horizontal reference by about 1/8 to 1/2 inch is a comparison line in the form of a wire, for example. A fixture supporting the comparison line provides a plurality of wire-end attachment points. Supporting the horizontal edges are a pair of scissor frames that are held open to a predetermined angle by a compression gusset. Opposite ends of a horizontal edge are secured to respective upper ends of each scissor frame. Against the compression stress on the compression gusset, the scissor frame is drawn by a tensioned guy wire.

9 Claims, 2 Drawing Sheets

METHOD AND APPARATUS FOR TESTING WEB BAGGINESS

BACKGROUND OF THE INVENTION

The present invention relates to material testing. More particularly, the invention is directed to a method and apparatus for monitoring the planar flatness of web material.

Paper, plastic film and other materials commonly used in sheet and strip form are often initially produced as a continuous material length that is referred to as a "web". Upon reaching the end of the continuous production line, the web product is reeled about a core into a cylindrical "roll". Along its production process line, a web will typically will be subjected to several processing steps before a final product is produced such as coating and/or saturating. In these processing steps, the web will be drawn over a number of roller type devices where it is stretched under tension while subjected to moisture and temperature changes, or both, to craft certain web characteristics. However, these temperature, moisture and tension variations may also cause the web to stretch or shrink unevenly across the crossweb direction and in the machine direction of the web. When the web returns to its steady-state condition, the stretched or shrunk areas will often cause warp and sag in the web flatness: conditions that are often characterized as bagginess. These changes in the condition of the web can cause problems in later web handling operations, including winding and converting. For example, it is more difficult to properly slit a creased or wrinkled web into strips than to slit a web without bagginess problems.

Web bagginess is particularly a problem in the crossweb or transverse direction, which is the direction that is transverse to the longitudinal or machine direction of the web as it is running through a manufacturing process. Contact methods of monitoring the bagginess of a web typically use a device that physically contacts the surface of the web. One method of measuring web bagginess is to stop the web handling process and use a yard stick or tape measure to measure the approximate width of the web at a particular location. This width measurement is compared to the expected width of the web. If the actual measured width is wider than the expected width, it is likely that the web has stretched and appropriate process adjustments can be made to compensate for web bagginess.

Another example of a contact method of monitoring web bagginess of a moving web is described in U.S. Pat. No. 5,317,913 (Feistkorn et al.). Feistkorn et al., describes a web sensing roller that contacts the surface of the web, where a carrier of the web sensing roller is guided within a housing and movable in a direction perpendicular to the plane of the web. The web sensing roller presses against the surface of the web as the web moves past the web sensing roller. The apparatus measures the distance that the web sensing roller moves form a predetermined reference position, which corresponds to the bagginess in the web.

For some web converters and conversion processes supply web bagginess causes no major difficulty. For others, the condition generates expensive or unacceptable difficulty. Tests for or measurement of web warp or bagginess that are carried out on the web production line, therefore, may be inappropriate for all of the web product that is consolidated onto a single production roll if that product is to be distributed to several converters for different product purposes.

Another prior art test for web bagginess has been the highly subjective practice of "sounding" a rolled length of the web with a bat, club or stick. The bat is struck against the roll ends with an educated swing. The resulting sound and feel of the impact is evaluated against the tester's experience.

It is an objective of the present invention, therefore, to teach a bagginess test procedure and corresponding apparatus that may be used selectively and quickly.

Another object of the invention is to provide a bagginess test apparatus that is small, light and highly portable.

Also, an object of the invention is provision of a bagginess test procedure that is direct and easily carried out by persons having minimum training.

A further object of the present invention is a bagginess monitoring procedure and apparatus that may be selectively applied to meet diverse needs and specifications for particular converters and products.

A still further object of the invention is to provide web manufacturers and processors with a tool for objectively measuring the amount of bagginess in a sheet of paper.

As a corollary to the foregoing objective, it is an object of the present invention to provide web manufacturing and processing personnel an easily and conveniently employed tool that may be used to avoid shipment of web products that do not conform to the intended customer's needs.

SUMMARY OF THE INVENTION

These and other objects of the invention to be hereinafter described are obtained by use of the method and apparatus to carry out the corresponding monitoring procedure. In a preferred embodiment of the invention, a pair of structural straight edges fabricated from ¾ inch square aluminum tubing, for example, are erected in substantially horizontal parallelism along an approximately three-foot separation space to establish a reference plane. Length of the straight edges is somewhat arbitrary beyond a length that is at least as wide as a section of the web under examination. However, a length of about three to four feet is preferred for convenience of manual manipulation.

A physical comparison line in the form of a tensioned wire or string is secured between the straight edges and parallel therewith. However, the comparison line position is located in a plane that is below the reference plane about ⅛ inch to about ½ in and parallel therewith.

A machine direction length of the web, about five feet for example, is drawn across the straight edges and aligned in the reference plane with sufficient tension to give the web substantially contiguous contact along both straight edges. So positioned, any planar warpage or bagginess in the sheet will manifest in the form of sheet material sag below the reference plane. Location of the comparison line establishes a tolerable sag limit. Sag in the material under evaluation that is sufficient to contact the comparison line may be judged as meeting or exceeding a predetermined limit and be considered unsuitable for the purpose intended.

Positionment of the comparison line with respect to the reference plane is set empirically as an experience determined function of the web grade, the intended conversion process, specifications acceptable to the converter and other such considerations.

An especially usefill configuration of the invention includes a pair of scissor frames. Opposite ends of each straight edge are secured to respective upper ends of four support legs. The two legs respective to each of the two scissor frames are crossed in an "x" configuration and secured together at the x intersection. A compression gusset is secured to the legs of each frame above the leg intersection and across the upper crotch of the intersection. At or slightly below the upper ends of the legs respective to each frame, a guy wire or cable is attached to and between the leg ends and prestressed in tension. These wires are preloaded as by a spring or turnbuckle. This arrangement produces great rigidity for the reference frame straight edges. Simultaneously, the entire structure may be extremely light and conveniently portable.

BRIEF DESCRIPTION OF THE DRAWINGS

Relative to the drawings wherein like reference characters designate like or similar elements throughout the several figures of the drawings.

DESCRIPTION OF THE PREFERRED EMBODIMENTS

Figure 1:
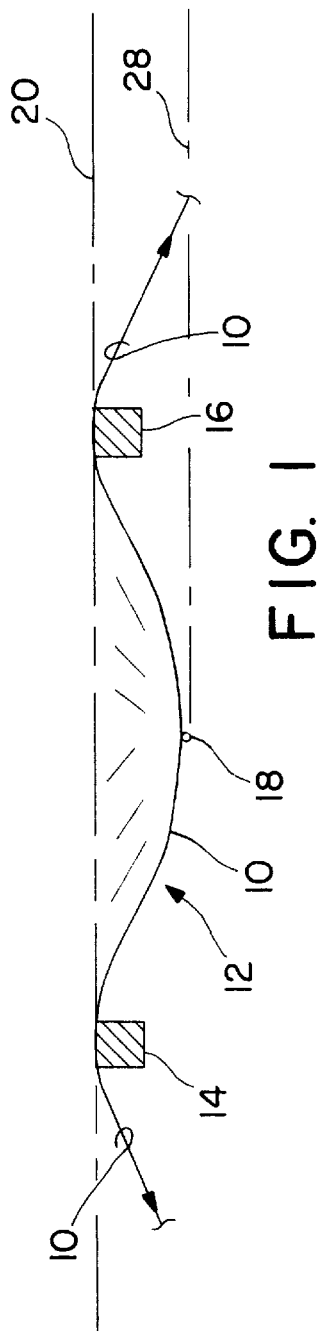
FIG. 1 is an end elevation view of the basic invention embodiment.

A general arrangement of the apparatus used to practice the invention is shown by the end view of FIG. 1 to include a pair of parallel straight edges 14 and 16. Typically, these straight edges 14 and 16 may be ¾ in. to 1 in. square aluminum tubing. An appropriate length for the straight edges 14 and 16 may be about 42 in. to about 48 in., for example. A typical parallel separation distance between the straight edges may be about 36 in., for example. These parallel straight edges 14 and 16 are aligned and appropriately secured in a substantially horizontal plane 20.

Substantially midway between the straight edges 14 and 16 is a comparison line 18 that is secured coextensively with the length of the straight edges 14 and 16 and substantially parallel therewith. However, the comparison line 18 is positioned below the reference plane 20 about ⅛ in. to about ½ in., for example, to provide visual definition for a substantially horizontal comparison plane 28. Structurally, the comparison line 18 may be a tightly drawn length of No. 8 to No. 10 carbon steel piano wire.

As a paper web bagginess monitor, an approximately 5 ft. by 3 ft. length (for example) of paper web 10 and about 3 ft. width (for example) is drawn across the straight edges 14 and 16 with the web machine direction oriented transversely to the line of the straight edges. So disposed, the web is uniformly drawn with sufficient tension to provide the web 10 with contiguous contact with the straight edges continuously along the web cross-machine direction. Bagginess or planar warp in the web 10 will usually demonstrate itself by a sag or bag 12 in the sheet edges. The degree of such bagginess is discerned by visual comparison of the proximity of the sag 12 to the comparison line 18. The separation distance below the reference plane 20 given to the comparison line 18 is an empirically determined value that is dependent upon the paper grade or caliper, for example. For this reason, means to adjust the web bagginess should be convenient.

Figure 2:
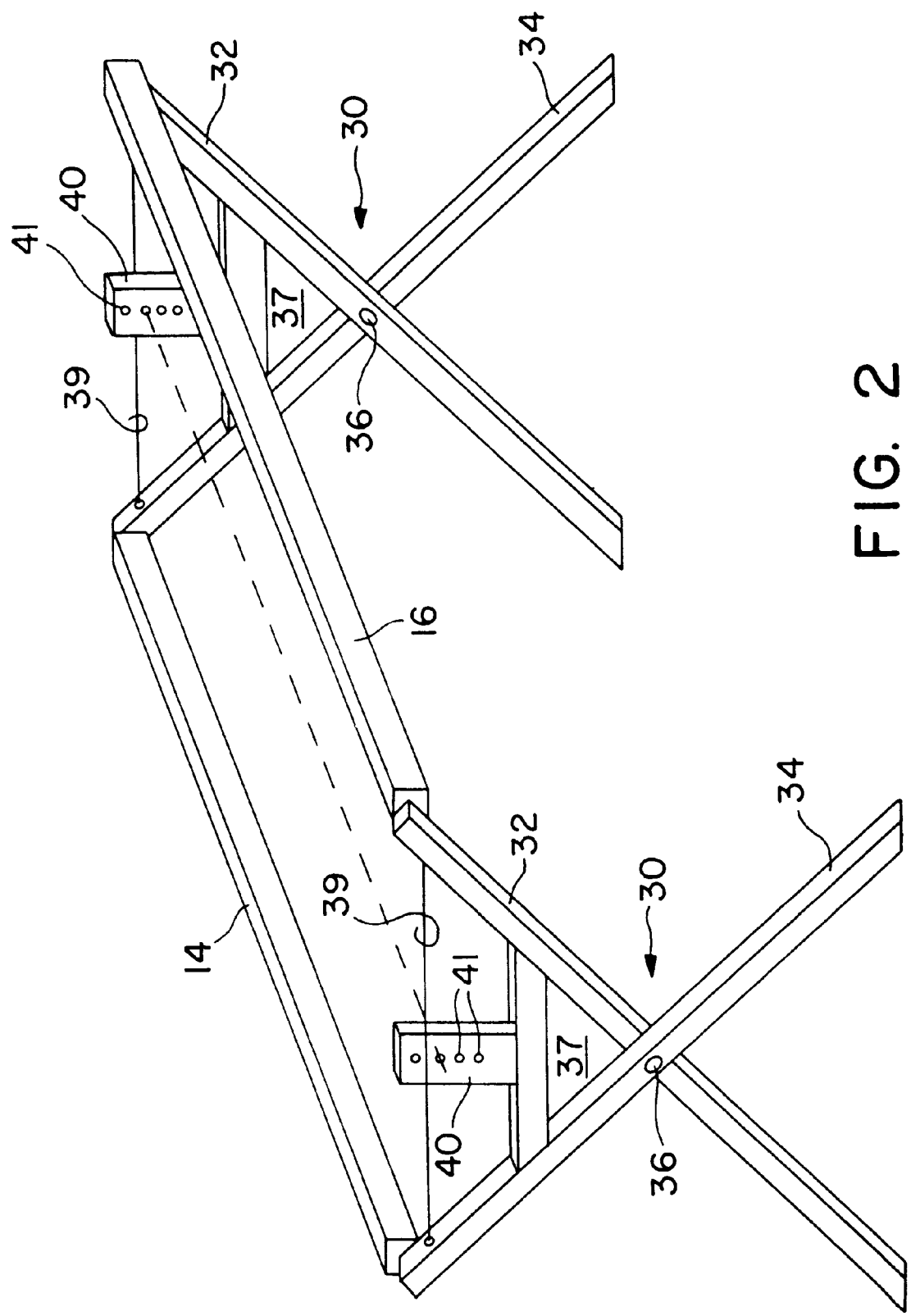
FIG. 2 is an isometric view of a preferred specific embodiment of the invention apparatus.

In the particularly preferred embodiment of FIG. 2, the straight edges 14 and 16 are supported by a pair of scissor frames 30. Each of the scissor frames is constructed with a pair of crossed legs 34 and 36. The legs are secured together at the intersection 30 of the cross. Across the upper crotch 37 of the frames 30, a compression gusset 38 is secured to each of the legs 32 and 34. Near the upper ends of the legs, about 1 in. down from the joint with respective straight edges, a guy line 39 is attached and tightly stressed to compressively preload the gussets 38. Length of the legs 32 and 34 is determined to position the reference plane 20 about 40 in. above a floor plane, for example.

With respect to FIG. 2, each of the compression gussets 38 supports a comparison line 18 ladder fixture 40. A typical ladder structure, may be ¼ in. by 1 in. aluminum flat bar stock that is drilled with a line of apertures 41 that are separated about ¼ in. apart, for example. Respective to the ladder fixture 40 at opposite ends of the straight edges 14 and 16, the apertures are aligned in coaxial pairs that define the location of the comparison line 18.

Figure 3:
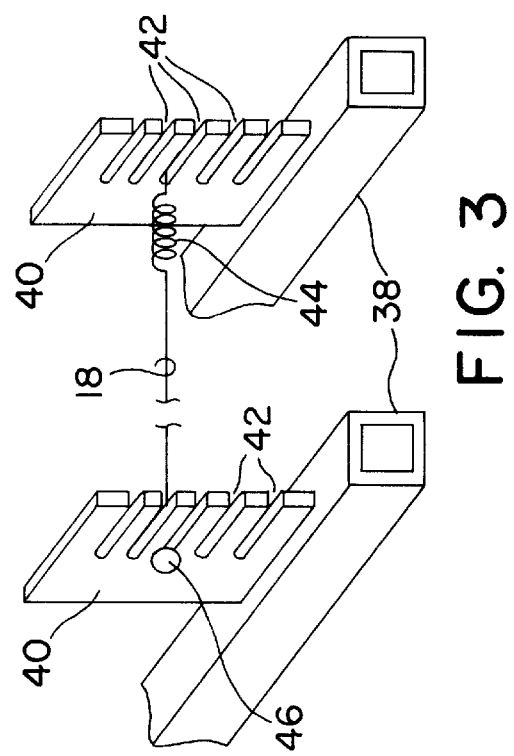
FIG. 3 is an isometric detail of a comparison line adjustment device.

The FIG. 3 embodiment of the invention describes a comparison line ladder embodiment 40 wherein the several comparison levels for the line 18 and hence, the comparison plane 28, are determined by slots 42 into the side of the ladders 40. A wire 18 is provided with swaged end buttons 46 and an intermediate tension spring 44. The comparison plane 28 is changed by sliding the wire 18 laterally through the appropriate pair of slots 42. The spring 44 maintains the appropriate tension on the wire 18.

Figure 4:
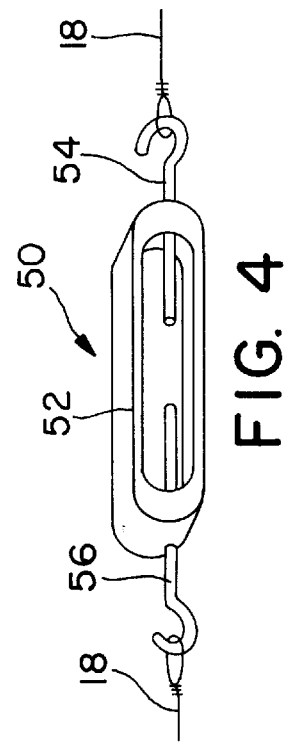
FIG. 4 is an isometric detail of an alternative comparison line adjustment device.

FIG. 4 illustrates a turnbuckle apparatus 50 for drawing tension on either the comparison line 18 or the guy lines 39. A turnbuckle comprises an open loop housing 52 that is coaxially penetrated by two threaded eye screws 54 and 56. The eye screw 54 is given a right-hand thread whereas the eye screw 56 is given a left-hand thread. Segments of the comparison line 18 are secured to respective dye screws. Rotation of the housing 52 will either close or open the axial distance between the eye screws depending on the rotational direction.

The foregoing description of the invention preferred embodiments has been presented for purposes of illustration and description. It is not intended to be exhaustive or to limit the invention to the precise forms disclosed. Obvious modifications or variations are possible in light of the above teachings. The embodiments were chose and described to provide the best illustration of the invention principles and practical application to thereby enable one of ordinary skill in the art to utilize the invention with various modifications as is suited to the particular use contemplated. All such modifications and variations are within the scope of the invention as determined by the appended claims when interpreted in accordance with breadth to which they are fairly, legally and equitably entitled.

We claim:

1. An apparatus for determining sagging of a material web, said apparatus comprising:

a pair of end frames;

a pair of substantially parallel edges secured to said end frames at a predetermined separation distance within a first, substantially horizontal plane; and a physical reference wire secured to said end frames substantially parallel with said parallel edges in a second, substantially horizontal plane at an adjustable separation distance from and below said first plane for determining whether a portion of said material web sags to or below said second plane.

2. An apparatus as described in claim 1 wherein said physical reference wire is a tensioned wire drawn between attachment fixtures that are secured in the proximity of opposite ends respective to said parallel edges.

3. An apparatus as described by claim 1 wherein the physical reference wire is positioned substantially equidistant between said parallel edges.

4. An apparatus as described by claim 1 wherein said end frames comprise leg means for supporting said parallel edges above a floor plane respective to opposite ends of each parallel edge.

5. An apparatus as described by claim 4 wherein at least two of said leg means are crossed and joined at an intersection of said cross to form at least one of said end frames.

6. An apparatus as described by claim 5 wherein said end frames further comprise a compression gusset secured to each end frame leg across an upper crotch therebetween.

7. An apparatus as described by claim 6 wherein said end frames further comprise a guy element secured to each end frame leg above said compression gusset.

8. A method for determining sagging of a material web, said method comprising the steps of:

securing a pair of substantially parallel edges at a predetermined separation distance within a first, substantially horizontal plane;

securing a physical reference line substantially parallel with said parallel edges in a second, substantially horizontal plane at an adjustable separation distance from and below said first plane, said adjustable distance being determined as a tolerable value of web warpage over the separation distance between said parallel edges;

tensioning an isolated length of web material across and in substantially full web contact with said parallel edges; and determining whether a portion of said web material sags to or below said second plane.

9. A method as described by claim 8 wherein orientation of said web material is characterized by a machine direction and a cross-direction, said cross-direction being substantially normal to said machine direction, said web material being positioned across said parallel edges with said cross-direction in substantially parallel alignment with said parallel edges.

* * * * *